USO06808577B2

(12) United States Patent
Miyazaki et al.

(10) Patent No.: US 6,808,577 B2
(45) Date of Patent: Oct. 26, 2004

(54) MONOLITHIC CERAMIC ELECTRONIC COMPONENT AND PRODUCTION PROCESS THEREFOR, AND CERAMIC PASTE AND PRODUCTION PROCESS THEREFOR

(75) Inventors: Makoto Miyazaki, Hirakata (JP); Satoru Tanaka, Moriyama (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 0 days.

(21) Appl. No.: 09/735,987

(22) Filed: Dec. 13, 2000

(65) Prior Publication Data

US 2001/0010617 A1 Aug. 2, 2001

(30) Foreign Application Priority Data

Dec. 13, 1999 (JP) ............................................ 11-352634
Oct. 19, 2000 (JP) ....................................... 2000-319521

(51) Int. Cl.[7] ............................ C04B 37/00; C08K 3/00
(52) U.S. Cl. ..................... 156/89.12; 106/311; 264/614
(58) Field of Search ....................... 156/89.12; 106/311; 264/614, 615, 618, 619, 670, 669

(56) References Cited

U.S. PATENT DOCUMENTS 5,502,013 A * 3/1996 James ......................... 501/153
5,733,499 A * 3/1998 Takeuchi et al. ............. 264/669
6,157,285 A * 12/2000 Tokuda et al. ............... 336/200

FOREIGN PATENT DOCUMENTS

GB       1274211    * 3/1969   ................. 264/670
JP       9-106925     4/1997

OTHER PUBLICATIONS

Machine Translation of JP 09–106925, Apr. 1997.*
Copy of Japanese Examination Report dated Apr. 8, 2003 (and English translation of same).

JP090106925 A; (Mitsubishi) See PAJ and WPI abstracts accession No.: 1997–286957[26]. Paste with binder, low boiling first solvent, added second solvent then heat removed first solvent.
JP050337911 A (Fujitsu) See WPI abstract accession No.: 1994–031290[04]. Green ceramic sheet paste with viscosity controlled by binder addition after solvent/powder mixing.
JP030247548 A (Nippon Shokubai) See WPI abstract accession No.: 1991–366446[25]. Paste with specified evaporation solvent.
JP050101708 A (Sumitomo) See WPI abstract accession No.: 1993–170110[21]. Electrode paste production involving first and second solvents and resin; evaporating a solvent after mixing.
JP600231458 A (Hitachi) See WPI abstract accession No.: 1986–004210[10]. Mixed binder, solvent, powder; solvent evaporated.

* cited by examiner

*Primary Examiner*—Christopher A. Fiorilla
(74) *Attorney, Agent, or Firm*—Dickstein, Shapiro, Morin & Oshinsky, LLP.

(57) ABSTRACT

A process for producing a monolithic ceramic electronic component, which includes: providing a ceramic slurry, a conductive paste and a ceramic paste; forming a plurality of composite structures each comprising a ceramic green sheet produced by shaping the ceramic slurry, internal circuit element films formed by applying the conductive paste partially onto a main surface of the ceramic green sheet so as to provide step-like sections, and a ceramic green layer which compensates for spaces defined by the step-like sections, the ceramic green layer being formed by applying the ceramic paste onto the region on the main surface of the sheet on which the element films are not formed so as to substantially compensate for the spaces; forming a green laminate by laminating the composite structures; and firing the green laminate. A monolithic ceramic electronic component which is produced through the process; a ceramic paste; and a production process for the paste are also disclosed.

18 Claims, 3 Drawing Sheets

MONOLITHIC CERAMIC ELECTRONIC COMPONENT AND PRODUCTION PROCESS THEREFOR, AND CERAMIC PASTE AND PRODUCTION PROCESS THEREFOR

BACKGROUND OF THE INVENTION

1. Field of the Invention

The present invention relates to a monolithic ceramic electronic component and a production process therefor, and to a ceramic paste and a production process therefor. More particularly, the present invention relates to a monolithic ceramic electronic component comprising internal circuit element films formed between ceramic sheets, and ceramic layers which compensate for spaces defined by step-like sections which are formed by the internal circuit element films, each ceramic layer being formed so as to have a pattern negative to that of the corresponding film, and a production process for the component; and to a ceramic paste which is advantageously employed for forming the ceramic layer, and a production process for the paste.

2. Background Art

When a monolithic ceramic electronic component, such as a monolithic ceramic capacitor, is produced, a plurality of ceramic green sheets are provided and the sheets are then laminated. In accordance with the intended function of the monolithic ceramic electronic component, an internal circuit element film, such as a conductive film or a resistive film, is formed on a specific ceramic green sheet, the film being an element of a capacitor, a resistor, an inductor, a varistor, a filter, etc.

In recent years, miniaturization and weight reduction of electronic devices such as mobile communication devices have been progressing. For example, when a monolithic ceramic electronic component is employed as a circuit element in such an electronic device, the size and the weight of the electronic component must be reduced. There has been increasing demand for a monolithic ceramic capacitor of small size and large capacitance.

A typical process for producing a monolithic ceramic capacitor is as follows. Dielectric ceramic powder, an organic binder, a plasticizer and an organic solvent are mixed together so as to prepare a ceramic slurry. The resultant ceramic slurry is shaped into a sheet having a thickness of some tens of $\mu$m, by means of a doctor-blade method or a similar method on a support, such as a polyester film, which is coated with a silicone resin serving as a peeling or release agent to thereby form a ceramic green sheet, and the sheet is then dried.

Subsequently, onto a main surface of the ceramic green sheet, a conductive paste is applied through screen printing so as to have a plurality of patterns which are separated from one another. Thereafter, the resultant sheet is dried to thereby form internal electrodes serving as internal circuit element films on the sheet. FIG. 1 is a plan view of a portion of a ceramic green sheet 2 on which internal electrodes 1 are formed so as to be distributed at a plurality of positions as described above.

Subsequently, the ceramic green sheet 2 is peeled off the support, and then cut into pieces of appropriate size. Thereafter, predetermined amounts of the pieces are laminated as partially shown in FIG. 2. Furthermore, predetermined amounts of ceramic green sheets not containing internal electrodes are laminated on opposite surfaces of the resultant laminate to thereby form a green laminate 3.

The green laminate 3 is pressed in a vertical direction with respect to a horizontal plane and then cut into laminate chips 4 as shown in FIG. 3, the chips being of appropriate size so as to be employed as individual monolithic ceramic capacitors. Subsequently, the binder is removed from each of the chips, the resultant chip is fired, and then external electrodes are formed on the chip to thereby produce a monolithic ceramic capacitor.

In order to reduce the size of such a capacitor and increase the capacitance thereof, the ceramic green sheets 2 and the internal electrodes 1, which are laminated, must be increased in number, and the ceramic green sheets 2 must be thinned.

However, when the laminated sheets and electrodes are increased in number and the sheets are thinned, the internal electrodes 1 are accumulated. Consequently, difference in thickness becomes more apparent between a portion at which the electrodes 1 are provided and a portion at which the electrodes 1 are not provided; or a portion at which relatively large amounts of the internal electrodes 1 are provided in a vertical direction with respect to a horizontal plane and a portion at which small amounts of the electrodes 1 are provided in the vertical direction. Therefore, for example, as shown in FIG. 3, the appearance of the resultant laminate chip 4 is deformed such that a main surface of the chip assumes a convex shape.

When the laminate chip 4 is deformed as shown in FIG. 3, a relatively large strain arises during pressing at the portion at which the internal electrode 1 is not provided or the portion at which relatively small amounts of the electrodes 1 are provided in a vertical direction with respect to a horizontal plane. In addition, adhesion between the ceramic green sheets 2 is lowered, and a structural defect such as delamination or micro-cracking tends to occur, the defect being caused by internal stress of the chip during firing.

When the laminate chip 4 is deformed as shown in FIG. 3, the internal electrode 1 is undesirably deformed, which may cause a short circuit.

The aforementioned problems may lower the reliability of the resultant monolithic ceramic capacitor.

In order to solve the aforementioned problems, for example, Japanese Patent Application Laid-Open (kokai) Nos. 56-94719, 3-74820, and 9-106925 disclose a method in which a ceramic green layer 5 is formed on a region of a ceramic green sheet 2 on which internal electrodes 1 are not formed, as shown in FIG. 4, to thereby substantially compensate for spaces defined by step-like sections which are formed by the internal electrodes 1 on the ceramic green sheet 2.

As described above, in the case in which the ceramic green layer 5 which compensates for spaces defined by the step-like sections is formed, when a green laminate 3a is formed as partially shown in FIG. 5, there is no substantial difference in thickness between the portion at which the electrodes 1 are provided and the portion at which the electrodes 1 are not provided; or between the portion at which relatively large amounts of the internal electrodes 1 are provided in a vertical direction with respect to a horizontal plane and the portion at which small amounts of the electrodes 1 are provided in the vertical direction. Therefore, as shown in FIG. 6, the resultant laminate chip 4a tends not to be undesirably deformed as shown in FIG. 3.

Consequently, the aforementioned structural defect such as delamination or micro cracking, or short circuit due to deformation of the internal electrode 1 tends not to occur, thereby enhancing the reliability of the resultant monolithic ceramic capacitor.

The aforementioned ceramic green layer 5 which compensates for spaces defined by the step-like sections has a composition similar to that of the ceramic green sheet 2, and the layer 5 is formed by applying a ceramic paste containing dielectric ceramic powder, an organic binder, a plasticizer and an organic solvent onto the green sheet 2. In order to form the layer 5 through printing at high accuracy so as to attain a thickness (e.g., 2 μm or less) which is equal to that of the internal electrode 1, dispersibility of the ceramic powder in the ceramic paste must be high.

In connection with the foregoing, for example, Japanese Patent Application Laid-Open (kokai) No. 3-74820 discloses a method for preparing a ceramic paste in which ceramic powder is dispersed by use of a three-roll mill. However, it is difficult to increase dispersibility of the ceramic powder through use of a three-roll mill only.

Japanese Patent Application Laid-Open (kokai) No. 9-106925 discloses that a ceramic slurry for forming a ceramic green sheet 2 is prepared by mixing dielectric ceramic powder, an organic binder, and a first organic solvent having a low boiling point, and the resultant slurry is employed for forming a ceramic green sheet 2; and that the slurry is mixed with a second organic solvent having a boiling point higher than that of the first organic solvent, and the resultant mixture is heated so as to remove only the first organic solvent from the mixture, to thereby prepare a ceramic paste for forming a ceramic green layer 5 which compensates for spaces defined by step-like sections.

When the ceramic paste is prepared through at least two mixing steps, as described above, dispersibility of the ceramic powder is improved to some extent. However, since the slurry or paste contains the organic binder, the viscosity of the slurry or paste becomes high during mixing. This imposes a limitation on improving dispersibility of the ceramic powder when an apparatus such as a ball mill is employed.

As already mentioned, there is a requirement for high dispersibility of the ceramic powder contained in the ceramic paste employed for forming the ceramic green layer 5 which compensates for spaces defined by step-like sections, the layer being very thin and having a thickness equal to that of the internal electrode 1. When the thickness of the internal electrode 1 decreases, the ceramic powder must exhibit a correspondingly higher dispersibility.

Even when dispersibility of the ceramic powder is low in the ceramic green layer 5, the ceramic green sheet 2 provided on the layer 5 may compensate for such low dispersibility to some extent. However, when the thickness of the sheet 2 decreases, the sheet cannot fully compensate for such low dispersibility.

Therefore, as the development of a monolithic ceramic capacitor of small size and large capacitance has progressed, there has been a growing need for high dispersibility of the ceramic powder contained in the ceramic green layer 5 which compensates for spaces defined by step-like sections.

In order to enhance dispersibility of the ceramic powder in the ceramic paste during mixing, the viscosity of the paste may be decreased. However, when the amount of the aforementioned organic solvent of low boiling point is increased in order to decrease the viscosity of the paste, removal of the solvent following dispersion of the ceramic powder requires a prolonged period of time.

Hereinabove, problems to be solved are described with reference to a monolithic ceramic capacitor, but similar problems may be involved in other monolithic ceramic electronic components, such as a monolithic inductor.

SUMMARY OF THE INVENTION

In view of the foregoing, an object of the present invention is to provide a process for producing a monolithic ceramic electronic component which enables solution of the above-described problems; and a monolithic ceramic electronic component produced through the process.

Another object of the present invention is to provide a process for producing a ceramic paste which is suitable for forming a very thin ceramic green layer such as the above-described ceramic layer which compensates for spaces defined by step-like sections; and a ceramic paste which is produced through the process.

Accordingly, the present invention provides a process for producing a monolithic ceramic electronic component. The process comprises the following steps.

Firstly, a ceramic slurry, a conductive paste, and a ceramic paste are provided.

Subsequently, a plurality of composite structures are formed, each comprising a ceramic green sheet which is formed from the ceramic slurry; internal circuit element films which are formed by applying the conductive paste partially onto a main surface of the ceramic green sheet so as to provide step-like sections; and a ceramic green layer which compensates for spaces defined by the step-like sections, the ceramic green layer being formed by applying the ceramic paste to the region on the main surface of the ceramic green sheet on which the element films are not formed, so as to substantially compensate for the spaces.

Subsequently, the composite structures are laminated, to thereby form a green laminate.

Then, the green laminate is fired.

In the process for producing a monolithic ceramic electronic component comprising the above essential steps, wherein a characteristic feature of the present invention resides in the step for providing the ceramic paste for forming ceramic green layers; i.e., the process for producing the ceramic paste.

The production process for the ceramic paste comprises a first dispersion step in which a first mixture containing ceramic powder and a first organic solvent undergoes processing for providing a primary dispersion; and a second dispersion step in which a second mixture containing an organic binder and the first mixture which has undergone the first dispersion step undergoes processing for providing a secondary dispersion. It should be noted that the organic binder is added during the second dispersion step.

In the present invention, in addition to the first organic solvent, a second organic solvent having a relative evaporation rate lower than that of the first organic solvent is employed. The second organic solvent may be added during the first dispersion step or the second dispersion step. Alternatively, the second organic solvent may be added during the first dispersion step, and more added during the second dispersion step. That is, the second organic solvent is contained in the first mixture and/or the second mixture.

After completion of the second dispersion step, the second mixture is heated to thereby selectively remove the first organic solvent from the mixture.

In the first dispersion step of the process for producing the ceramic paste, the first mixture preferably contains an organic dispersant.

Preferably, the first organic solvent has a relative evaporation rate of about 100 or more at 20° C., and the second organic solvent has a relative evaporation rate of about 50 or less at 20° C.

In the production process for the ceramic paste, the second mixture is preferably subjected to filtration after completion of the second dispersion step and before the removal of the first organic solvent.

Preferably, the production process further comprises a step in which the organic binder is dissolved in the first organic solvent and/or the second organic solvent, to thereby form an organic vehicle, and a step in which the organic vehicle is subjected to filtration, so that the second mixture contains the organic binder included in the organic vehicle which has been subjected to filtration.

In the production process, the first and second organic solvents are chosen such that the relative evaporation rate of the former is higher than that of the latter. Usually, selection of these organic solvents is readily carried out when the first and second organic solvents are chosen such that the boiling point of the former is lower than that of the latter.

When the first and second organic solvents are chosen on the basis of the difference in the boiling points, the difference between the boiling point of the first organic solvent and that of the second organic solvent is preferably about 50 degrees or more.

In the present invention, the ceramic slurry for forming the ceramic green sheet preferably contains ceramic powder having a composition substantially the same as that of the ceramic powder contained in the ceramic paste for forming the ceramic green layer which compensates for spaces defined by step-like sections.

Preferably, a dielectric ceramic powder is contained in a ceramic slurry and ceramic paste. In this case, when internal circuit element films are internal electrodes which are arranged so as to provide capacitance therebetween, a monolithic ceramic capacitor can be produced.

Preferably, a magnetic ceramic powder is contained in a ceramic slurry and ceramic paste. In this case, when internal circuit element films are formed as hook-shaped conductive films, a monolithic inductor can be produced.

The present invention also provides a monolithic ceramic electronic component produced through the above-described production process.

The present invention also provides a process for producing a ceramic paste as described above, and a ceramic paste produced through the process.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with accompanying drawings, in which.

DETAILED DESCRIPTION OF PREFERRED EMBODIMENTS

One embodiment of the present invention will next be described by taking a production process for a monolithic ceramic capacitor as an example. The production process will be described with reference to FIGS. 4 through 6.

In order to carry out the embodiment, there are provided a ceramic slurry for forming a ceramic green sheet 2; a conductive paste for forming internal electrodes 1; and a ceramic paste for forming a ceramic green layer 5 which compensates for spaces defined by step-like sections formed by the electrodes 1.

The ceramic slurry is prepared by mixing dielectric ceramic powder, an organic binder, a plasticizer and an organic solvent having a relatively low boiling point. The ceramic slurry is shaped into a sheet, by means of a doctor blade process or a similar process, on a support such as a polyester film (not shown in the Figs.) which is coated with a resin such as a silicone resin serving as a peeling agent, to thereby obtain the ceramic green sheet 2. Subsequently, the resultant sheet is dried. The thickness of the ceramic green sheet 2 is some $\mu$m after drying.

On a main surface of the ceramic green sheet 2, the internal electrodes 1 are formed so as to be distributed at a plurality of positions. The thickness of each of the electrodes is about 1 $\mu$m after firing. The internal electrodes 1 are formed, for example, by applying the conductive paste onto the ceramic green sheet 2 through screen printing, and then drying the paste. Each of the electrodes 1 has a predetermined thickness, and thus spaces defined by step-like sections formed by the electrodes 1 are provided on the ceramic green sheet 2.

Subsequently, a ceramic green layer 5 is formed on the region on the main surface of the ceramic green sheet 2 on which the internal electrodes 1 are not formed, so as to substantially compensate for the spaces defined by the step-like sections. The ceramic green layer 5 is formed by applying the ceramic paste onto the ceramic green sheet 2 through screen printing so as to have a pattern negative to that of the internal electrodes 1, and then the resultant layer 5 is dried. The ceramic paste which is employed for forming the layer 5 has significant features in the present invention, and the paste will be described below in more detail.

In the above description, the ceramic green layer 5 is formed after the internal electrodes 1 are formed. However, the ceramic green layer 5 may be formed before the internal electrodes 1 are formed.

Figure 4:
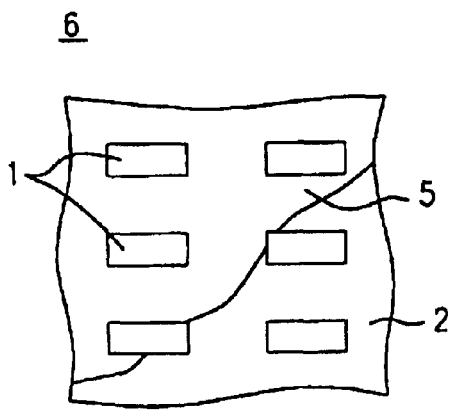
FIG. 4 is a plan view of a portion of a composite structure 6 which is produced through a production process for a monolithic ceramic capacitor as shown in FIG. 5.

A plurality of composite structures 6 are prepared. Each of the structures 6 as shown in FIG. 4 includes the ceramic green sheet 2, the internal electrodes 1 and the ceramic green layer 5, the electrodes and the layer being formed on the sheet as described above. Each of the composite structures 6 is peeled off the support, and then cut into appropriately sized pieces. Predetermined amounts of the pieces are laminated to form a lamination product, and then ceramic green sheets not containing such internal electrodes and ceramic green layers are laminated on opposite surfaces of the product, to thereby form a green laminate 3a as partially shown in FIG. 5.

Figure 6:
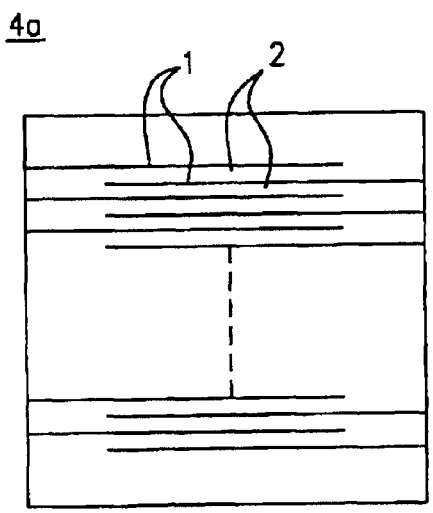
FIG. 6 is a schematic cross-sectional view of a laminate chip 4a which is produced through a production process for a monolithic ceramic capacitor as shown in FIG. 5.

The green laminate 3a is pressed in a vertical direction with respect to a horizontal plane, and then, as shown in FIG. 6, cut into appropriately-sized laminate chips 4a such that each of the chips can be suitably employed for producing a monolithic ceramic capacitor. Subsequently, the binder is removed from the laminate chip, and the resultant chip is fired. Thereafter, external electrodes are formed on the chip, to thereby produce a monolithic ceramic capacitor.

Figure 1:
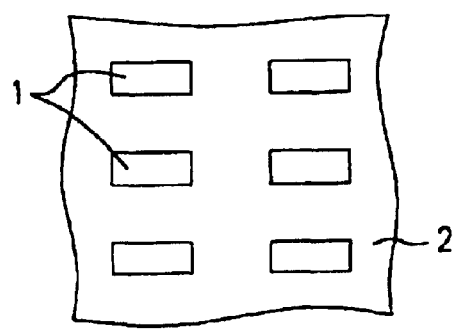
FIG. 1 is a plan view of a portion of a ceramic green sheet 2 on which internal electrodes 1 are formed through a production process for a monolithic ceramic capacitor as shown in FIG. 2.
Figure 2:
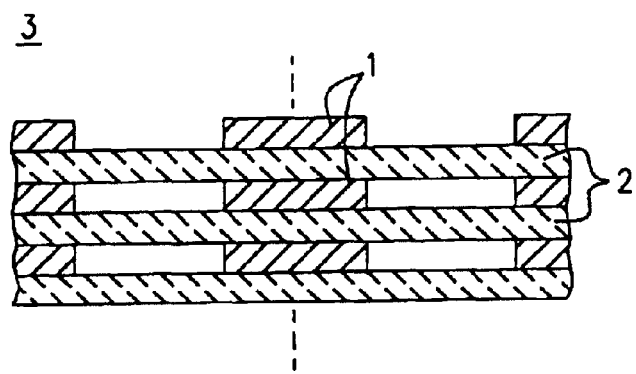
FIG. 2 is a schematic cross-sectional view of a portion of a green laminate 3, illustrating a process for producing a conventional monolithic ceramic capacitor of interest.
Figure 3:
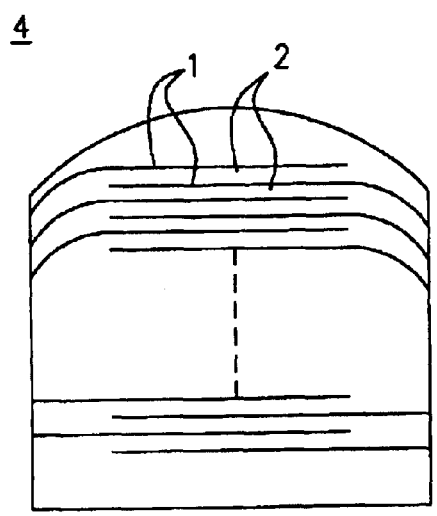
FIG. 3 is a schematic cross-sectional view of a laminate chip 4 which is produced through a production process for a monolithic ceramic capacitor as shown in FIG. 2.
Figure 5:
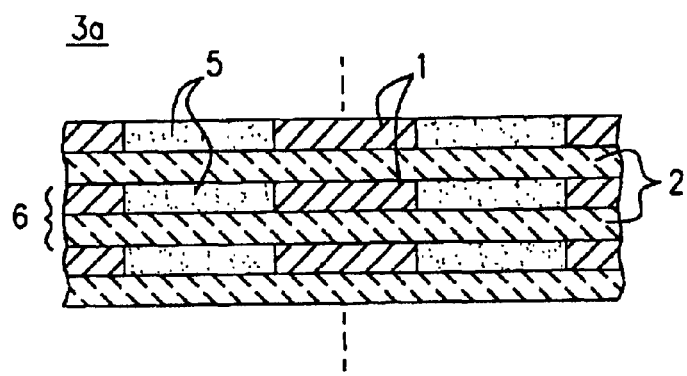
FIG. 5 is a schematic cross-sectional view of a portion of a green laminate 3a, illustrating a process for producing a monolithic ceramic capacitor of interest, which is an embodiment of the present invention.

As described above, when the ceramic green layer 5 is formed, in the green laminate 3a as partially shown in FIG. 5, there is no substantial difference in thickness between the portion at which the electrodes 1 are provided and the portion at which the electrodes 1 are not provided; or the portion at which relatively large numbers of the internal electrodes 1 are provided in a vertical direction with respect to a horizontal plane and the portion at which small numbers of the electrodes are provided in a vertical direction with respect to a horizontal plane. Therefore, as shown in FIG. 6, the laminate chip 4a tends not to be undesirably deformed as it is in FIG. 3. Consequently, structural defects such as delamination or micro cracking, or short-circuiting may not occur in the resultant monolithic ceramic capacitor.

A characteristic feature of the present invention resides in the process for producing a ceramic paste for forming the ceramic green layer 5. When the ceramic paste is produced through the process, dispersibility of the ceramic powder contained in the paste can be enhanced.

In order to produce the ceramic paste, there are carried out a first dispersion step in which a first mixture containing ceramic powder and a first organic solvent is subjected to processing for providing a primary dispersion; and a second dispersion step in which a second mixture containing an organic binder and the first mixture which has been subjected to the first dispersion step is subjected to processing for providing a secondary dispersion.

In the first dispersion step, an organic binder is not added, and thus the first mixture can be subjected to processing for providing a primary dispersion at low viscosity. Therefore, dispersibility of the ceramic powder is easily enhanced. In the first dispersion step, air adsorbed on the ceramic powder is replaced by the first organic solvent, and thus the ceramic powder is sufficiently wetted with the first organic solvent, and the agglomerated ceramic powder is finely divided into particles as well.

In the second dispersion step, the organic binder can be mixed sufficiently and uniformly while dispersibility of the ceramic powder is maintained at a high level, the dispersibility being enhanced in the first dispersion step as described above. In addition, the ceramic powder may further be pulverized in the second dispersion step.

In the present invention, in addition to the first organic solvent, a second organic solvent having a relative evaporation rate lower than that of the first organic solvent is employed. The second organic solvent may be added during the first dispersion step or the second dispersion step. Alternatively, the second organic solvent may be added during the first dispersion step, and more added during the second dispersion step.

After completion of the second dispersion step, the second mixture is heated, to thereby selectively remove the first organic solvent from the mixture.

As described above, the first organic solvent is removed after completion of the second dispersion step, and thus the viscosity of the second mixture can be maintained at a relatively low level during the second dispersion step. Therefore, dispersibility can be maintained at a relatively high level, as well as the solubility of the organic binder, which is added during the second dispersion step as described above, can be enhanced.

The ceramic paste produced as described above substantially contains only the second organic solvent, although a trace amount of the first organic solvent may exist in the paste. Since the second organic solvent has a relative evaporation rate lower than that of the first organic solvent, the rate of drying of the ceramic paste can be reduced to a predetermined value or less. Therefore, the paste can be subjected to screen printing without any problem.

In the first and second dispersion steps of the production process, a customary apparatus such as a ball mill is employed for carrying out processing for providing a dispersion.

In the present invention, a variety of organic solvents may be employed as the first or second organic solvent. Therefore, an appropriate organic solvent may be chosen for each of the first and second organic solvents in consideration of the relative evaporation rate of the organic solvent.

Examples of such organic solvents include ketones such as methyl ethyl ketone, methyl isobutyl ketone, diisopropyl ketone, isophorone and acetone; hydrocarbons such as toluene, benzene, xylene, and n-hexane; alcohols such as methanol, ethanol, isopropanol, butanol, and amyl alcohol; esters such as ethyl acetate, butyl acetate, and isobutyl acetate; esters, hydrocarbons, and alcohols, such as ethyl cellosolve, butyl cellosolve, cellosolve acetate, methyl cellosolve acetate, butyl carbitol, cyclohexanol, dihydroterpineol, terpineol, dipropylene glycol, and dimethyl phthalate; pine oil; chlorinated hydrocarbons such as methylene chloride; and a mixture thereof.

In order to readily remove the first organic solvent after completion of the second dispersion step, the solvent preferably has a relative evaporation rate of about 100 or more at 20° C., more preferably about 150 or more. As used herein, the term "relative evaporation rate" refers to an evaporation rate relative to the evaporation rate of n-butyl acetate (boiling point: 126.5° C.) when the evaporation rate thereof is defined as 100. Relative evaporation rate is calculated on the basis of the following formula:

Relative evaporation rate=(evaporation time of n-butyl acetate)/(evaporation time of subject solvent), wherein evaporation time is measured on the basis of weight.

Examples of organic solvents having a relative evaporation rate of about 100 or more, which are suitable for the first organic solvent, include methyl ethyl ketone (relative evaporation rate: 465), methyl isobutyl ketone (relative evaporation rate: 145), acetone (relative evaporation rate: 720), toluene (relative evaporation rate: 195), benzene (relative evaporation rate: 500), methanol (relative evaporation rate: 370), ethanol (relative evaporation rate: 203), isopropanol (relative evaporation rate: 205), ethyl acetate (relative evaporation rate: 525), isobutyl acetate (relative evaporation rate: 152), butyl acetate (relative evaporation rate: 100) and a mixture thereof.

On the other hand, the second organic solvent preferably has a relative evaporation rate of about 50 or less at 20° C., in order to allow efficient screen printing.

Examples of organic solvents having a relative evaporation rate of about 50 or less, which are suitable for the second organic solvent, include diisopropyl ketone (relative evaporation rate: 49), methyl cellosolve acetate (relative evaporation rate: 40), cellosolve acetate (relative evaporation rate: 24), butyl cellosolve (relative evaporation rate: 10), cyclohexanol (relative evaporation rate: 10 or less), pine oil (relative evaporation rate: 10 or less), dihydroterpineol (relative evaporation rate: 10 or less), isophorone (relative evaporation rate: 10 or less), terpineol (relative evaporation rate: 10 or less), dipropylene glycol (relative evaporation rate: 10 or less), dimethyl phthalate (relative evaporation rate: 10 or less), butyl carbitol (relative evaporation rate: 40 or less) and a mixture thereof.

The first or second organic solvent may be chosen on the basis of its boiling point instead of its relative evaporation rate as described above. The first or second organic solvent is readily chosen on the basis of its boiling point rather than its relative evaporation rate. In many cases, when the first and second organic solvents are chosen such that the boiling point of the former is lower than that of the latter, the relative evaporation rate of the former is higher than that of the latter.

Boiling points of some of the aforementioned organic solvents are as follows: methyl ethyl ketone (79.6° C.), methyl isobutyl ketone (118.0° C.), acetone (56.1 ° C.), toluene (111.0° C.), benzene (79.6° C.), methanol (64.5° C.), ethanol (78.5° C.), isopropanol (82.5° C.), ethyl acetate (77.1° C.), isobutyl acetate (118.3° C.), diisopropyl ketone (143.5° C.), methyl cellosolve acetate (143° C.), cellosolve acetate (156.2° C.), butyl cellosolve (170.6° C.), cyclohexanol (160° C.), pine oil (195–225° C.), dihydroterpineol (210° C.), isophorone (215.2° C.), terpineol (219.0° C.), dipropylene glycol (231.8° C.) and dimethyl phthalate (282.4° C.). The first and second organic solvents may be chosen on the basis of such boiling points.

When the first and second organic solvents are chosen on the basis of the difference in the boiling points, the difference between the boiling point of the first organic solvent and that of the second organic solvent is preferably about 50 degrees or more. This is because, when the difference is about 50 degrees or more, the first organic solvent can be selectively and easily removed through heating after completion of the second dispersion step.

In order to facilitate screen printing, the second organic solvent preferably has a boiling point of about 150° C. or higher, more preferably about 200–250° C. When the boiling point is lower than about 150° C., the ceramic paste dries rapidly, and thus the printing pattern meshes tend to be undesirably filled with the paste, whereas when the boiling point is higher than about 250° C., the printed film is difficult to dry, and thus a prolonged period of time is necessary for drying.

The organic binder to be employed in the ceramic paste preferably dissolves in an organic solvent at room temperature. Examples of such an organic binder include polyacetals such as polyvinyl butyral and polybutyl butyral; poly(meth) acrylates; modified celluloses such as ethyl cellulose; alkyds; vinylidenes; polyethers; epoxy resins; urethane resins; polyamide resins; polyimide resins; polyamidoimide resins; polyester resins; polysulfone resins; liquid crystal polymers; polyimidazole resins; and polyoxazoline resins.

The aforementioned polyvinyl butyral, serving as the organic binder, is produced through condensation between polyvinyl alcohol and butyraldehyde. Polyvinyl butyral products include a low polymerization product, a medium polymerization product and a high polymerization product, in which the amounts of an acetyl group and a butyral group are about 6 mol % or less and about 62–82 mol %, respectively. The polyvinyl butyral product serving as the organic binder in the ceramic paste of the present invention is preferably a medium polymerization product in which the amount of a butyral group is about 65 mol %, in consideration of the viscosity of the polyvinyl butyral in an organic solution and the toughness of the film which is produced through drying of the polyvinyl butyral.

The amount of the organic binder is about 1–20 wt. % on the basis of the entirety of the ceramic powder, preferably about 3–10 wt. %.

In the first dispersion step, the first mixture preferably contains an organic dispersant. When an organic dispersant dissolved in the first organic solvent or in a mixture of the first and second solvents is added to the first mixture, dispersibility of the ceramic powder is further enhanced.

The type of organic dispersant employed is not particularly limited, but the dispersant preferably has a molecular weight of about 10,000 or less in consideration of dispersibility thereof. The dispersant may be an anionic dispersant, a cationic dispersant or a nonionic dispersant. Examples of preferred dispersants include polyacrylic acids and ammonium salts thereof, polyacrylate copolymers, polyethylene oxide, polyoxyethylene alkyl amyl ether, fatty acid diethanolamide, polyethyleneimine, copolymers of polyoxypropylene monoallyl monobutyl ether and maleic anhydride (and styrene).

The amount of the organic dispersant is about 0.1–5 wt. %, preferably about 0.5–2.0 wt. %, on the basis of the entirety of the ceramic powder.

The second mixture is preferably subjected to filtration after completion of the second dispersion step and before the first organic solvent is removed. Through filtration, impurities, flocculates of the ceramic powder and non-dissolved organic binder, which may exist in the ceramic paste, can be removed, and thus dispersibility of the ceramic paste is reliably enhanced. In addition, very small air bubbles adhered to the ceramic powder are broken or removed through filtration, and thus, when the ceramic green layer 5 formed of the ceramic paste is fired, the amount of pinholes may be reduced in the resultant ceramic layer.

Alternatively, the organic binder is dissolved in the first organic solvent and/or the second organic solvent to thereby form an organic vehicle; the organic vehicle is subjected to filtration; and the organic binder included in the vehicle which has been subjected to filtration may be added to the second mixture.

Each filtration may be carried out repeatedly. Alternatively, they may be carried out in combination. Whether filtration is carried out repeatedly or in combination, dispersibility of the ceramic paste is further enhanced.

In the aforementioned filtration step, a filter formed from stainless steel or plastic such as polypropylene or fluorine-containing resin is employed. In order to increase the filtration rate, the second mixture or the organic vehicle may be subjected to pressure using a gas such as air or nitrogen gas, or may be drawn through the filter by being subjected to reduced pressure.

The ceramic powder contained in the ceramic paste preferably has a composition substantially the same as that of the ceramic powder contained in the ceramic slurry for forming the ceramic green sheet 2. This is because, when these ceramic powders have substantially the same composition, the ceramic green layer 5 and the ceramic green sheet 2 can be uniformly sintered.

When the ceramic powders have substantially the same composition, the powders contain the same primary component. For example, even when the powders contain different secondary components such as metallic oxide and glass in trace amounts, the powders are considered to have substantially the same composition. When the ceramic powder contained in the ceramic green sheet 2 satisfies temperature characteristics of capacitance, i.e., the B characteristic specified by JIS and the X7R characteristic specified by EIA, if the ceramic powder contained in the ceramic paste for forming the ceramic green layer 5 has the same primary component and satisfies the B and X7R characteristics, these powders are allowed to have different secondary components.

Figure 7:
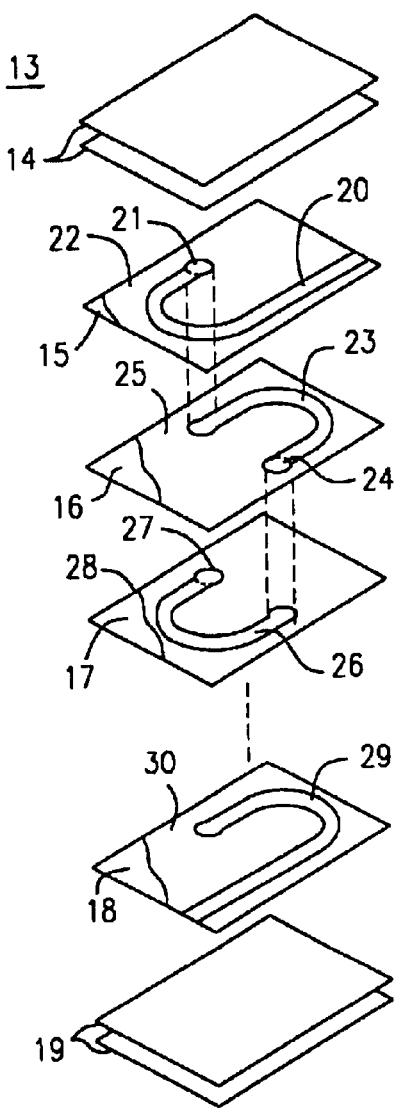
FIG. 7 is an exploded perspective view of elements constituting a green laminate 13 for producing a monolithic inductor, which is another embodiment of the present invention.
Figure 8:
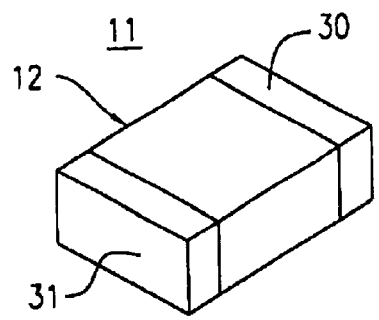
FIG. 8 is a perspective view of the appearance of a monolithic inductor 11 containing a laminate chip 12 which is produced by firing the green laminate 13 shown in FIG. 7.

FIG. 7 illustrates the production process for a monolithic inductor which is another embodiment of the present invention. FIG. 8 is a perspective view of the appearance of a monolithic inductor 11 produced through the production process. FIG. 7 is an exploded perspective view of elements constituting a green laminate 13 for producing a laminated chip 12 contained in the monolithic inductor 11.

The green laminate 13 contains a plurality of ceramic green sheets 14, 15, 16, 17, 18 and 19, and is produced by laminating the sheets 14 through 19.

The ceramic green sheets 14 through 19 are produced by shaping a ceramic slurry containing magnetic ceramic powder into sheets by means of a doctor blade process or a similar process, and then drying the resultant sheets. Each of the ceramic green sheets 14 through 19 has a thickness, for example, of 10–30 $\mu$m after drying.

On each of the sheets 15 through 18, which are located in the middle portion of the laminate 13, a hook-shaped conductive film and a ceramic green layer are formed which compensates for spaces defined by step-like sections formed by the film. A process for the formation of the film and the layer are described below.

Firstly, a hook-shaped conductive film 20 is formed on the ceramic green sheet 15. The film 20 is formed such that a first end of the film extends to the edge of the sheet 15. A via hole conductor 21 is formed at a second end of the film 20.

A hole which is to be filled with the conductor 21 is formed in the sheet 15 by means of a laser or punching. Subsequently, the conductive paste is applied onto the sheet 15 through screen printing, and then the resultant sheet is dried to thereby form the hook-shaped conductive film 20 and the via hole conductor 21.

A ceramic green layer 22 is formed on the region on the main surface of the ceramic green sheet 15 on which the hook-shaped conductive film 20 is not formed so as to substantially compensate for spaces defined by the step-like sections formed by the film 20. The ceramic green layer 22 is formed by applying the ceramic paste onto the sheet 15 through screen printing (e.g., a paste containing magnetic ceramic powder which has specific features in the present invention), and then drying the resultant sheet.

Subsequently, on the ceramic green sheet 16, a hook-shaped conductive film 23, a via hole conductor 24 and a ceramic green layer 25 which compensates for spaces defined by step-like sections formed by the film 23 are formed in a manner similar to that described above. A first end of the film 23 is connected to the second end of the film 20 with the intervention of the via hole conductor 21. The via hole conductor 24 is formed at a second end of the film 23.

Subsequently, on the ceramic green sheet 17, a hook-shaped conductive film 26, a via hole conductor 27 and a ceramic green layer 28 which compensates for spaces defined by step-like sections formed by the film 26 are formed in a manner similar to that described above. A first end of the film 26 is connected to the second end of the film 23 with the intervention of the via hole conductor 24. The via hole conductor 27 is formed at a second end of the film 26.

If necessary, the above-described lamination of the ceramic green sheets 16 and 17 is carried out repeatedly.

Subsequently, on the ceramic green sheet 18, a hook-shaped conductive film 29 and a ceramic green layer 30 which compensates for spaces defined by step-like sections formed by the film 29 are formed. A first end of the film 29 is connected to the second end of the film 26 with the intervention of the via hole conductor 27. The film 29 is formed such that a second end thereof extends to the edge of the sheet 18.

Each of the hook-shaped conductive films 20, 23, 26 and 29 has a thickness of about 30 $\mu$m after drying.

In the green laminate 13, which is produced through the lamination of a plurality of composite structures including the ceramic green sheets 14 through 19, the hook-shaped conductive films 20, 23, 26 and 29 are successively connected to one another with the intervention of the via hole conductors 21, 24 and 27, to thereby form a coil-shaped conductor having a plurality of turns.

The laminate chip 12 which constitutes the monolithic inductor 11 shown in FIG. 8 is produced by firing the green laminate 13. The green laminate 13 shown in FIG. 7 is employed for producing only one laminate chip 12. However, a green laminate for producing a plurality of laminate chips may be formed. In this case, after the green laminate is formed, the laminate is cut into pieces, to thereby produce a plurality of laminate chips.

Subsequently, as shown in FIG. 8, external electrodes 30 and 31 are formed on the opposite ends of the laminate chip 12, such that the electrodes 30 and 31 are connected to the first end of the film 20 and the second end of the film 29, respectively, to thereby produce the monolithic inductor 11.

Ceramic powder is contained in the ceramic green sheet 2 and the ceramic green layer 5 which constitute the monolithic ceramic capacitor which is described above with reference to FIGS. 4 through 6; and the ceramic powder is also contained in the ceramic green sheets 14 through 19 and the ceramic green layers 22, 25, 28 and 30 which constitute the monolithic inductor 11 which is described above with reference to FIGS. 7 and 8. Examples of the ceramic powder include ceramic powder of an oxide such as alumina, zirconia, magnesia, titanium oxide, barium titanate, lead titanate zirconate or ferrite-manganese; and ceramic powder of a non-oxide such as silicon carbide, silicon nitride or sialon. The ceramic powder which is employed is preferably pulverized and has a spherical shape. The mean particle size of the powder is preferably about 5 $\mu$m or less, more preferably about 1 $\mu$m.

When barium titanate containing an alkali metal oxide as an impurity in an amount of about 0.1 wt. % or less is employed as the ceramic powder, a trace amount of the following metallic oxide or glass component may be incorporated into the ceramic powder.

Examples of the metallic oxide include terbium oxide, dysprosium oxide, holmium oxide, erbium oxide, ytterbium oxide, manganese oxide, cobalt oxide, nickel oxide and magnesium oxide.

Examples of the glass component include $Li_2$—(SiTi)$O_2$—MO (wherein MO refers to $Al_2O_3$ or $ZrO_2$), $SiO_2$—$TiO_2$—MO (wherein MO refers to BaO, CaO, SrO, MgO, ZnO or MnO), $Li_2O$—$B_2O_3$—(SiTi)$O_2$+MO (wherein MO refers to $Al_2O_3$ or $ZrO_2$) and $B_2O_3$—$Al_2O_3$—MO (wherein MO refers to BaO, CaO, SrO, or MgO) and $SiO_2$.

A conductive paste is employed for forming the internal electrodes 1 which constitute the monolithic ceramic capacitor which is described above with reference to FIGS. 4 through 6; and the conductive paste is also employed for forming the hook-shaped conductive films 20, 23, 26 and 29 and the via hole conductors 21, 24, and 27 which constitute the monolithic inductor 11 which is described above with reference to FIGS. 7 and 8. The conductive paste employed will next be described.

The conductive paste employed in the monolithic ceramic capacitor includes copper powder, nickel powder or conductive powder containing an alloy of Ag/Pd having a ratio of about 60 wt. %/40 wt. % to 10 wt. %/90 wt. %. Such powder has a mean particle size of about 0.02–3 μm, preferably about 0.05–0.5 μm. The powder (100 parts by weight); an organic binder (about 2–20 parts by weight, preferably about 5–10 parts by weight); a resinate of a metal such as Ag, Au, Pt, Ti, Si, Ni or Cu, serving as a sintering-suppressing agent (about 0.1–3 parts by weight, preferably about 0.5–1 parts by weight, as reduced to a metal); and an organic solvent (about 35 parts by weight) are kneaded by use of a three-roll mill, and then the same or a different organic solvent is further added to the resultant mixture to control the viscosity to thereby prepare the conductive paste.

The conductive paste employed in the monolithic inductor 11 includes conductive powder containing Ag or an alloy of Ag/Pd having a ratio of about 80 wt. %/20 wt. % to 100 wt. %/0 wt. %. The powder (100 parts by weight); and the organic binder, the sintering-suppressing agent and the organic solvent, which are the same as those employed in the above conductive paste, are kneaded at the same proportions as described above by use of a three-roll mill, and then the same or a different organic solvent is further added to the resultant mixture to control the viscosity, to thereby prepare the conductive paste.

EXAMPLES

The present invention will next be described in more detail by way of Test Examples.

Test Example 1

Test Example 1 relates to a monolithic ceramic capacitor. Test Example 1 was carried out for confirming the effects of the first and second dispersion steps in the preparation of a ceramic paste for forming a ceramic green layer which compensates for spaces defined by step-like sections.
Preparation of Ceramic Powder Firstly, barium carbonate ($BaCO_3$) and titanium oxide ($TiO_2$) were weighed so as to attain a mol ratio of 1:1, and wet-mixed by use of a ball mill, and the resultant mixture was dehydrated and then dried. Subsequently the dried mixture was calcined at 1,000° C. for two hours, and then pulverized, to thereby obtain dielectric ceramic powder.
Preparation of Ceramic Slurry and Formation of Ceramic Green Sheet The thus-prepared ceramic powder (100 parts by weight), polyvinyl butyral (medium polymerization product) (7 parts by weight), dioctyl phthalate (DOP) serving as a plasticizer (3 parts by weight), methyl ethyl ketone (30 parts by weight), ethanol (20 parts by weight), toluene (20 parts by weight) and zirconia grinding balls having a diameter of 1 mm (600 parts by weight) were placed in a ball mill, and wet-mixed for 20 hours to thereby prepare a ceramic slurry.

The resultant ceramic slurry was shaped into a ceramic green sheet having a thickness of 3 μm (2 μm after firing) by means of a doctor blade process. The sheet was dried at 80° C. for five minutes.
Preparation of Conductive Paste Metallic powder (Ag/Pd=70/30) (100 parts by weight), ethyl cellulose (4 parts by weight), alkyd resin (2 parts by weight), Ag metallic resinate (3 parts by weight, 17.5 parts by weight as reduced to Ag) and butyl carbitol acetate (35 parts by weight) were kneaded by use of a three-roll mill, and then terpineol (35 parts by weight) was added to the resultant mixture to control the viscosity of the mixture.
Preparation of Ceramic Paste for Forming a Ceramic Green Layer which Compensates for Spaces Defined by Step-like Sections
Sample 1

The above-prepared dielectric ceramic powder (100 parts by weight), methyl ethyl ketone having a relative evaporation rate of 465 (70 parts by weight) and zirconia grinding balls having a diameter of 1 mm (600 parts by weight) were placed in a ball mill, and wet-mixed for 16 hours. Subsequently, terpineol having a boiling point of 220° C. and a relative evaporation rate of 10 or less (40 parts by weight) and an ethyl cellulose resin (5 parts by weight) were added to the ball mill, and the resultant mixture was further mixed for 16 hours to thereby obtain a ceramic slurry mixture.

Subsequently, the above-obtained ceramic slurry mixture was subjected to reduced-pressure distillation in a hot bath at 60° C. by use of an evaporator for two hours. Through distillation, methyl ethyl ketone was completely removed from the slurry to thereby obtain a ceramic paste. Then, terpineol (10 to 20 parts by weight) was added to the ceramic paste, and the resultant mixture was dispersed in an automatic mortar, to thereby regulate the viscosity of the mixture.
Sample 2

The above-prepared dielectric ceramic powder (100 parts by weight), methyl ethyl ketone (70 parts by weight), terpineol (30 parts by weight) and zirconia grinding balls having a diameter of 1 mm (600 parts by weight) were placed in a ball mill, and wet-mixed for 16 hours. Subsequently, terpineol having a boiling point of 220° C. (10 parts by weight) and an ethyl cellulose resin (5 parts by weight) were added to the ball mill, and the resultant mixture was further mixed for 16 hours to thereby obtain a ceramic slurry mixture.

Subsequently, the above-obtained ceramic slurry mixture was subjected to reduced-pressure distillation in a hot bath at 60° C. by use of an evaporator for two hours. Through distillation, methyl ethyl ketone was completely removed from the slurry to thereby obtain a ceramic paste. Then, terpineol (10 to 20 parts by weight) was added to the ceramic paste, and the resultant mixture was dispersed in an automatic mortar to thereby control the viscosity of the mixture.
Sample 3

The above-prepared dielectric ceramic powder (100 parts by weight), methyl ethyl ketone (70 parts by weight), a polyacrylic acid quaternary ammonium salt dispersant (weight average molecular weight: 1,000) (0.5 parts by weight) and zirconia grinding balls having a diameter of 1 mm (600 parts by weight) were placed in a ball mill, and wet-mixed for 16 hours. Subsequently, terpineol having a boiling point of 220° C. (10 parts by weight) and an ethyl cellulose resin (5 parts by weight) were added to the ball mill, and the resultant mixture was further mixed for 16 hours to thereby obtain a ceramic slurry mixture.

Subsequently, the above-obtained ceramic slurry mixture was subjected to reduced-pressure distillation in a hot bath at 60° C. by use of an evaporator for two hours. Through distillation, methyl ethyl ketone was completely removed from the slurry, to thereby obtain a ceramic paste. Then, terpineol (10 to 20 parts by weight) was added to the ceramic paste, and the resultant mixture was dispersed in an automatic mortar to thereby control the viscosity of the mixture.

Sample 4

The above-prepared dielectric ceramic powder (100 parts by weight), terpineol having a boiling point of 220° C. (40 parts by weight), and an ethyl cellulose resin (5 parts by weight) were mixed in an automatic mortar, and then kneaded by use of a three-roll mill to thereby obtain a ceramic paste.

Production of Monolithic Ceramic Capacitor

The conductive paste was applied onto a main surface of the above-formed ceramic green sheet through screen printing, and then dried at 80° C. for 10 minutes to thereby form internal electrodes. The size, shape and position of the internal electrodes were determined so as to fit a laminate chip produced in the below-described step. Subsequently, the ceramic paste of each of Samples 1 through 4 was applied onto the main surface of the ceramic green sheet through screen printing, and then dried at 80° C. for 10 minutes to thereby form a ceramic green layer which compensates for spaces defined by step-like sections. The thicknesses of the internal electrode and the ceramic green layer were 1 μm after drying and 0.5 μm after firing.

Subsequently, the ceramic green sheets containing the internal electrodes and the ceramic green layer (200 sheets) were laminated, and then the lamination product was sandwiched by some tens of ceramic green sheets not containing internal electrodes to thereby form a green laminate. The green laminate was thermally pressed at 80° C. under a pressure of 1,000 Kg/cm$^2$.

Subsequently, the resultant laminate was cut into a plurality of laminate chips by use of a cutting blade. The dimensions of each of the chips were determined so as to attain dimensions of 3.2 mm (length)×1.6 mm (width)×1.6 mm (thickness) after firing.

The above-obtained laminate chips were arranged on a setter for firing on which a small amount of zirconia powder had been distributed, and the temperature of the chips was elevated from room temperature to 250° C. over 24 hours to thereby remove the organic binder. Then, the resultant chips were placed in a firing furnace, and the chips were fired with a temperature profile having a maximum temperature of 1,300° C. for about 20 hours.

Next, each of the resultant sintered chips was placed in a barrel, and then the side surfaces of the chip were subjected to polishing. Thereafter, external electrodes were formed on the opposite sides of the sintered chip, to thereby produce a monolithic ceramic capacitor as a sample.

Evaluation of Characteristics

The ceramic paste and the monolithic ceramic capacitor of each of Samples 1 through 4 were evaluated for a variety of characteristics. The results are shown in Table 1.

TABLE 1

|  | Sample No. | | | |
| --- | --- | --- | --- | --- |
|  | 1 | 2 | 3 | 4 |
| Solid content (wt. %) | 65 | 64 | 66 | 67 |
| Viscosity (Pa · s) | 9 | 8 | 10 | 12 |
| Dispersion degree | 0 | 0 | −0.2 | 0.3 |
| Thickness of printed film (μm) | 4 | 4 | 3 | 5 |
| Ra (μm) | 0.5 | 0.5 | 0.3 | 1.5 |
| Ratio of structural defects (%) | 2 | 3 | 0 | 80 |

The characteristics shown in Table 1 were evaluated as follows.

Solid content: the ceramic paste (about 1 g) was weighed accurately, and then the paste was allowed to stand in a heat convection-type oven at 150° C. for three hours. The solid content of the paste was calculated on the basis of the weight of the paste after heating.

Viscosity: the viscosity of the ceramic paste was measured by use of an E-type viscometer (product of Tokyo Keiki) at 20° C. at a revolution of 2.5 rpm.

Dispersion degree: the particle size distribution of the ceramic powder was measured by use of a light diffraction particle size distribution measuring apparatus, and the degree of dispersion of the powder was calculated on the basis of the resultant data. Briefly, the above-prepared ceramic powder was dispersed in water by use of an ultrasonic homogenizer, and the particles were subjected to ultrasonic waves until they were reduced to their minimum size. When the particles reached their minimum size, the particle size at D90 of the particle size distribution was recorded as "limitation particle size." Separately, the ceramic paste was diluted with ethanol, and the particle size at D90 of the particle size distribution was recorded as "paste particle size." The dispersion degree of the ceramic powder was calculated on the basis of the following formula:

$$\text{dispersion degree} = (\text{paste particle size}/\text{limitation particle size}) - 1.$$

When the dispersion degree assumes a positive value, dispersibility of the powder is high when the value is nearer to zero. In contrast, when the dispersion degree assumes a negative value, when the larger the absolute value, the higher the dispersibility of the powder.

Thickness of printed film: the ceramic paste was applied onto a 96% alumina substrate so as to attain a thickness of 20 μm by use of a 400-mesh stainless steel screen having a thickness of 50 μm, and the resultant substrate was dried at 80° C. for 10 minutes to thereby form a printed film for evaluation. The thickness of the film was obtained using the data measured by a non-contact-type laser surface roughness meter.

Surface roughness (Ra): a printed film for evaluation was formed in a manner similar to that described above. The surface roughness (Ra) of the film, i.e., the averaged absolute value of deviation of a undulation-averaged center line and a roughness curve, was obtained from the data measured by a non-contact-type laser surface roughness meter.

Ratio of structural defects: the resultant sintered chip for producing a monolithic ceramic capacitor was observed by appearance and under an ultrasonic microscope. When some unusual portions were observed, the internal structural defects of the chip was confirmed after the chip had been polished. The ratio of structural defects was obtained on the basis of the following relation: (the number of sintered chips having structural defects/the total number of sintered chips).

As is apparent from Table 1, the ceramic pastes and the capacitors of Samples 1 through 3—in which the first and second dispersion steps were carried out, and the organic binder was added during the second dispersion step—exhibit excellent characteristics in terms of dispersibility, thickness of printed film, surface roughness and ratio of structural defects, as compared with the ceramic paste and the capacitor of Sample 4, in which such procedures were not carried out.

Test Example 2

Test Example 2 also relates to a monolithic ceramic capacitor. Test Example 2 was carried out to confirm the effects of addition of the filtration step in the preparation of a ceramic paste for forming a ceramic green layer which compensates for spaces defined by step-like sections.

The procedure of Test Example 1 was repeated, except that the step of "preparation of ceramic paste for forming a ceramic green layer which compensates for spaces defined by step-like sections" was carried out as described below to thereby produce monolithic ceramic capacitors.

Preparation of Ceramic Paste for Forming a Ceramic Green Layer which Compensates for Spaces Defined by Step-like Sections Sample 5

A ceramic slurry mixture which was prepared in a manner similar to the case of Sample 1 of Test Example 1 was subjected to filtration under pressure through use of a filter having an absolute filtration precision of 20 µm (i.e., a substance having a size of 10 µm or more can be removed through the filter at a probability of 99.7%).

Subsequently, the resultant ceramic slurry mixture was subjected to processing in a manner similar to the case of Sample 1 of Test Example 1 to thereby obtain a ceramic paste.

Sample 6

The preparation procedure for Sample 5 was repeated, except that, after completion of filtration through use of a filter having an absolute filtration precision of 20 µm, filtration through use of a filter having an absolute filtration precision of 1 µm was further carried out under pressure to thereby obtain a ceramic paste.

Sample 7

Terpineol having a boiling point of 220° C. (40 parts by weight), methyl ethyl ketone (10 parts by weight) and an ethyl cellulose resin (5 parts by weight) were mixed with a planetary mixer to thereby prepare an organic vehicle. Subsequently, the organic vehicle was subjected to filtration under pressure through use of a filter having an absolute filtration precision of 20 µm.

Separately, the above-prepared dielectric ceramic powder (100 parts by weight), methyl ethyl ketone (60 parts by weight) and zirconia grinding balls having a diameter of 1 mm (600 parts by weight) were placed in a ball mill, and wet-mixed for 16 hours.

Subsequently, the above-prepared organic vehicle which had been subjected to filtration was added to the ball mill, and the resultant mixture was further mixed for 16 hours to thereby obtain a ceramic slurry mixture.

The ceramic slurry mixture was subjected to processing in a manner similar to the case of Sample 1 of Test Example 1 to thereby obtain a ceramic paste.

Sample 8

The preparation procedure for Sample 7 was repeated except that, after completion of filtration through use of a filter having an absolute filtration precision of 20 µm, filtration through use of a filter having an absolute filtration precision of 1 µm was further carried out under pressure to thereby obtain a ceramic paste.

Sample 9

The preparation procedure for Sample 7 was repeated, and filtration of the ceramic slurry mixture was further carried out in a manner similar to the case of Sample 5 to thereby obtain a ceramic paste.

The ceramic paste and the monolithic ceramic capacitor of each of Samples 5 through 9 were evaluated in terms of a variety of characteristics. The results are shown in Table 2.

TABLE 2

| | Sample No. | | | | |
|---|---|---|---|---|---|
| | 5 | 6 | 7 | 8 | 9 |
| Solid content (wt. %) | 66 | 67 | 66 | 67 | 68 |
| Viscosity (Pa · s) | 10 | 12 | 15 | 14 | 16 |
| Dispersion degree | −0.1 | −0.2 | 0 | 0 | −0.3 |
| Thickness of printed film (µm) | 3 | 2 | 3 | 2 | 2 |
| Ra (µm) | 0.4 | 0.3 | 0.5 | 0.5 | 0.2 |
| Ratio of structural defects (%) | 1.5 | 1 | 1.5 | 1 | 0 |

The methods for evaluating the characteristics shown in Table 2 are similar to those employed for the items shown in Table 1.

Sample 5 shown in Table 2 is different from Sample 1 shown in Table 1 in that the ceramic slurry mixture of Sample 5 was subjected to filtration. Therefore, comparison between Sample 5 and Sample 1 reveals the effect of filtration. That is, the comparison reveals that the ceramic paste and the capacitor of Sample 5 exhibit excellent characteristics in terms of dispersibility, thickness of printed film, surface roughness and ratio of structural defects, as compared with the ceramic paste and the capacitor of Sample 1.

As shown in Table 2, comparison between Samples 5 and 6; comparison between Samples 7 and 8; comparison between Samples 5 and 9; and comparison between Samples 7 and 9 reveal that when filtration is carried out repeatedly or different types of filtration are carried out in combination, the effects are further enhanced.

Test Example 3

Test Example 3 also relates to a monolithic ceramic capacitor. Test Example 3 was carried out to confirm the preferable relative evaporation rate range for each of the first and second organic solvents employed in the production of a ceramic paste for forming a ceramic green layer which compensates for spaces defined by step-like sections.

The procedure of Test Example 1 was repeated except that the step of "preparation of ceramic paste for forming a ceramic green layer which compensates for spaces defined by step-like sections" was carried out as described below, to thereby produce monolithic ceramic capacitors.

Preparation of Ceramic Paste for Forming a Ceramic Green Layer which Compensates for Spaces Defined by Step-like Sections Sample 10

The preparation procedure for Sample 1 of Test Example 1 was repeated, except that n-butyl acetate having a relative evaporation rate of 100 was employed as a first organic solvent to thereby prepare a ceramic paste.

Sample 11

The preparation procedure for Sample 1 of Test Example 1 was repeated except that acetone having a relative evaporation rate of 720 was employed as a first organic solvent to thereby prepare a ceramic paste.

Sample 12

The preparation procedure for Sample 1 of Test Example 1 was repeated except that isobutyl alcohol having a relative evaporation rate of 83 was employed as a first organic solvent to thereby prepare a ceramic paste.

Sample 13

The preparation procedure for Sample 1 of Test Example 1 was repeated except that methanol having a relative evaporation rate of 370 was employed as a first organic solvent and that methyl cellosolve having a relative evaporation rate of 55 was employed as a second organic solvent to thereby prepare a ceramic paste.

The ceramic paste and the monolithic ceramic capacitor of each of Samples 10 through 13 were evaluated in terms of a variety of characteristics. The results are shown in Table 3. Table 3 also shows the first and second organic solvents employed in Samples 10 through 13.

TABLE 3

|  | Sample No. | | | |
| --- | --- | --- | --- | --- |
|  | 10 | 11 | 12 | 13 |
| First organic solvent (relative evaporation rate) | n-Butyl acetate (100) | Acetone (720) | Isobutyl alcohol (83) | Methanol (370) |
| Second organic solvent (relative evaporation rate) | Terpineol (10 or less) | Terpineol (10 or less) | Terpineol (10 or less) | Methyl cellosolve (55) |
| Evaporation time (Hr) | 2 | 1 | 4 | Evaporation continues for a long period of time |
| Solid content (wt. %) | 70 | 67 | 66 | — |
| Viscosity (Pa · s) | 15 | 9 | 10 | — |
| Dispersion degree | 0.2 | 0 | 0.4 | — |
| Ra ($\mu$m) | 0.7 | 0.5 | 1.0 | — |
| Ratio of structural defects (%) | 3 | 2 | 10 | — |

In Table 3, the heading "evaporation time" refers to the time from the beginning of evaporation under reduced pressure to the end of evaporation of the organic solvent (usually the first organic solvent). The methods for evaluating the characteristics shown in Table 3 other than the "evaporation time" are similar to those employed for the items in Table 1.

As is apparent from Table 3, evaporation of the first organic solvent is completed in Samples 10 and 11 within a short period of time since the first organic solvent has a relative evaporation rate of 100 or more and the second organic solvent has a relative evaporation rate of 50 or less. In addition, the ceramic pastes and the capacitors of Samples 10 and 11 exhibit excellent characteristics in terms of dispersibility, surface roughness and ratio of structural defects.

In contrast, evaporation of the first organic solvent in Sample 12 is not completed within a short period of time since the first organic solvent has a relative evaporation rate of less than 100, although the second organic solvent has a relative evaporation rate of 50 or less. The ceramic paste and the capacitor of Sample 12 exhibit poor characteristics in terms of dispersibility, surface roughness and ratio of structural defects compared with those of Samples 10 and 11.

Evaporation of the second organic solvent continued for a long period of time in Sample 13 since the second organic solvent has a relative evaporation rate of more than 50, although the first organic solvent has a relative evaporation rate of 100 or more. In this case, the ceramic paste dries rapidly during screen printing, and thus screen meshes are undesirably filled with the paste, resulting in poor screen printing.

Test Example 4

Test Example 4 relates to a monolithic inductor. Test Example 4 was carried out to confirm the effects of the first and second dispersion steps in the preparation of a ceramic paste for forming a ceramic green layer which compensates for spaces defined by step-like sections.

Preparation of Ceramic Powder

Ferric oxide powder, zinc oxide powder, nickel oxide powder and copper oxide powder were weighed so as to attain proportions of 49.0 mol %, 29.0 mol %, 14.0 mol % and 8.0 mol %, respectively. These powders were wet-mixed by use of a ball mill, and the resultant mixture was dehydrated to dryness. Subsequently the dried mixture was calcined at 750° C. for one hour, and then pulverized to thereby obtain magnetic ceramic powder.

Preparation of Ceramic Slurry and Formation of Ceramic Green Sheet

The thus-prepared magnetic ceramic powder (100 parts by weight), polyvinyl butyral (medium polymerization product) (7 parts by weight), dioctyl phthalate (DOP) serving as a plasticizer (3 parts by weight), methyl ethyl ketone (30 parts by weight), ethanol (20 parts by weight), toluene (20 parts by weight) and zirconia grinding balls having a diameter of 1 mm (600 parts by weight) were placed in a ball mill and wet-mixed for 20 hours to thereby prepare a ceramic slurry.

The resultant ceramic slurry was shaped into a ceramic green sheet having a thickness of 20 $\mu$m (15 $\mu$m after firing) by means of the doctor blade process. The sheet was dried at 80° C. for five minutes.

Preparation of Conductive Paste

Metallic powder (Ag/Pd=70/30) (100 parts by weight), ethyl cellulose (4 parts by weight), alkyd resin (2 parts by weight), Ag metallic resinate (3 parts by weight, 17.5 parts by weight as reduced to Ag) and butyl carbitol acetate (35 parts by weight) were kneaded by use of a three-roll mill, and then terpineol (35 parts by weight) was added to the resultant mixture to control the viscosity of the mixture.

Preparation of Ceramic Paste for Forming a Ceramic Green Layer which Compensates for Spaces Defined by Step-like Sections Sample 14

The above-prepared magnetic ceramic powder (100 parts by weight), methyl ethyl ketone having a relative evaporation rate of 465 (70 parts by weight) and zirconia grinding balls having a diameter of 1 mm (600 parts by weight) were placed in a ball mill and wet-mixed for 16 hours. Subsequently, terpineol having a boiling point of 220° C. and a relative evaporation rate of 10 or less (40 parts by weight) and an ethyl cellulose resin (5 parts by weight) were added to the ball mill, and the resultant mixture was further mixed for 16 hours to thereby obtain a ceramic slurry mixture.

Subsequently, the above-obtained ceramic slurry mixture was subjected to reduced-pressure distillation in a hot bath at 60° C. by use of an evaporator for two hours. Through distillation, methyl ethyl ketone was completely removed from the slurry to thereby obtain a ceramic paste. Then, terpineol (10 to 20 parts by weight) was added to the ceramic paste, and the resultant mixture was dispersed in an automatic mortar to thereby control the viscosity of the mixture.
Sample 15

The above-prepared magnetic ceramic powder (100 parts by weight), methyl ethyl ketone (70 parts by weight), terpineol (30 parts by weight) and zirconia grinding balls having a diameter of 1 mm (600 parts by weight) were placed in a ball mill, and wet-mixed for 16 hours. Subsequently, terpineol having a boiling point of 220° C. (10 parts by weight) and an ethyl cellulose resin (5 parts by weight) were added to the ball mill, and the resultant mixture was further mixed for 16 hours to thereby obtain a ceramic slurry mixture.

Subsequently, the above-obtained ceramic slurry mixture was subjected to reduced-pressure distillation in a hot bath at 60° C. by use of an evaporator for two hours. Through distillation, methyl ethyl ketone was completely removed from the slurry to thereby obtain a ceramic paste. Then, terpineol (10 to 20 parts by weight) was added to the ceramic paste, and the resultant mixture was dispersed in an automatic mortar to thereby control the viscosity of the mixture.
Sample 16

The above-prepared magnetic ceramic powder (100 parts by weight), methyl ethyl ketone (70 parts by weight), a polyacrylic acid quaternary ammonium salt dispersant (weight average molecular weight: 1,000) (0.5 parts by weight) and zirconia grinding balls having a diameter of 1 mm (600 parts by weight) were placed in a ball mill and wet-mixed for 16 hours. Subsequently, terpineol having a boiling point of 220° C. (10 parts by weight) and an ethyl cellulose resin (5 parts by weight) were added to the ball mill, and the resultant mixture was further mixed for 16 hours to thereby obtain a ceramic slurry mixture.

Subsequently, the above-obtained ceramic slurry mixture was subjected to reduced-pressure distillation in a hot bath at 60° C. by use of an evaporator for two hours. Through distillation, methyl ethyl ketone was completely removed from the slurry to thereby obtain a ceramic paste. Then, terpineol (10 to 20 parts by weight) was added to the ceramic paste, and the resultant mixture was dispersed in an automatic mortar to thereby control the viscosity of the mixture.
Sample 17

The above-prepared magnetic ceramic powder (100 parts by weight), terpineol having a boiling point of 220° C. (40 parts by weight) and an ethyl cellulose resin (5 parts by weight) were mixed in an automatic mortar, and then kneaded by use of a three-roll mill to thereby obtain a ceramic paste.
Production of Monolithic Inductor A hole to be filled a via hole conductor was formed in a predetermined position of the above-prepared magnetic ceramic green sheet such that a coil-shaped conductor was able to be formed after a plurality of the sheets were laminated. Separately, a conductive paste was applied to the magnetic ceramic green sheet, and then dried at 80° C. for 10 minutes to thereby form a hook-shaped conductive film on the main surface of the sheet and a via hole conductor in the hole. Subsequently, each of the magnetic ceramic pastes of Sample 14 through 17 was applied onto the magnetic ceramic green sheet, and then dried at 80° C. for 10 minutes to thereby form a magnetic ceramic green layer which compensates for spaces defined by step-like sections. The thicknesses of the hook-shaped conductive film and the ceramic green layer were 30 μm after drying and 20 μm after firing.

Subsequently, the magnetic ceramic green sheets containing the hook-shaped conductive film, the via hole conductor and the ceramic green layer (11 sheets) were laminated such that a coil-shaped conductor was formed inside the resultant lamination product. Thereafter, the lamination product was sandwiched by magnetic ceramic green sheets not containing the hook-shaped conductive films to thereby form a green laminate. The green laminate was thermally pressed at 80° C. under a pressure of 1,000 Kg/cm$^2$.

Subsequently, the resultant laminate was cut into a plurality of laminate chips by use of a cutting blade. The dimensions of each of the chips were determined so as to attain dimensions of 3.2 mm (length)×1.6 mm (width)×1.6 mm (thickness) after firing.

Subsequently, the laminate chip was heated at 400° C. for two hours to thereby remove the organic binder, and then the resultant chip was fired at 900° C. for 90 minutes.

Next, the resultant sintered chip was placed in a barrel, and then the side surfaces of the chip were subjected to polishing. Thereafter, external electrodes predominantly formed of silver were formed on the opposite sides of the sintered chip to thereby produce a chip-type monolithic inductor as a sample.
Evaluation of Characteristics The ceramic paste and the monolithic inductor of each of Samples 14 through 17 were evaluated in terms of a variety of characteristics. The results are shown in Table 4.

TABLE 4

| | Sample No. | | | |
|---|---|---|---|---|
| | 14 | 15 | 16 | 17 |
| Solid content (wt. %) | 72 | 73 | 72 | 73 |
| Viscosity (Pa · s) | 15 | 14 | 17 | 18 |
| Dispersion degree | 0 | 0 | −0.3 | 0.2 |
| Thickness of printed film (μm) | 20 | 21 | 19 | 19 |
| Ra (μm) | 0.5 | 0.5 | 0.2 | 1.6 |
| Ratio of structural defects (%) | 1 | 1 | 0 | 50 |

The methods for evaluating the characteristics shown in Table 4 are similar to those employed for the items shown in Table 1.

As is apparent from Table 4, the ceramic pastes and the capacitors of Samples 14 through 16—in which the first and second dispersion steps were carried out and the organic binder was added during the second dispersion step—exhibit excellent characteristics in terms of dispersibility, thickness of printed film, surface roughness and ratio of structural defects compared with the ceramic paste and the capacitor of Sample 17 in which such procedures were not carried out. The results are similar to those of Test Example 1 shown in Table 1.

Hereinabove, the case in which dielectric ceramic powder or magnetic ceramic powder is incorporated into the ceramic paste of the present invention is described. However, in the present invention, the characteristics of the ceramic paste are not influenced by electric characteristics of the ceramic powder contained in the paste. Therefore, a ceramic paste containing insulating ceramic powder or piezoelectric ceramic powder exhibits characteristics similar to those of the ceramic paste containing dielectric ceramic powder or magnetic ceramic powder.

As described above, according to the present invention, a ceramic paste is produced through the following steps: a first dispersion step in which a first mixture containing ceramic powder and a first organic solvent undergoes processing for providing a primary dispersion; a second dispersion step in which a second mixture containing an organic binder and the first mixture which has undergone the first dispersion step undergoes processing for providing a secondary dispersion; a step in which a second organic solvent having a relative evaporation rate lower than that of the first organic solvent is added to the first mixture and/or the second mixture; and a removal step for selectively removing the first organic solvent from the second mixture through heating the second mixture. Consequently, dispersibility of the ceramic powder contained in the ceramic paste can be further enhanced. Therefore, the ceramic paste is advantageously employed for forming a very thin ceramic green layer at high pattern accuracy.

According to the present invention, since a ceramic paste is employed for forming a ceramic green layer on the region on the main surface of a ceramic green sheet on which internal circuit element films are not formed so as to substantially compensate for spaces defined by the step-like sections formed by the films, the resultant monolithic ceramic electronic component does not have structural defects such as cracking and delamination, and exhibits high reliability.

According to the present invention, the size and the weight of a monolithic ceramic electronic component can be satisfactorily reduced. Therefore, when the present invention is applied to a monolithic ceramic capacitor, the size of the capacitor can be advantageously reduced and the capacitance thereof can be advantageously increased. In addition, when the present invention is applied to a monolithic inductor, the size of the inductor can be advantageously reduced and the inductance thereof can be advantageously increased.

When an organic dispersant is incorporated into the first mixture during the above-described first dispersion step, dispersibility of the ceramic powder is further enhanced.

When the first organic solvent has a relative evaporation rate of 100 or more at 20° C. and the second organic solvent has a relative evaporation rate of 50 or less at 20° C., the first organic solvent can be readily removed during the removal step, and in addition, screen printing is facilitated.

When the second mixture is subjected to filtration after completion of the second dispersion step and before the removal step; or when the organic binder is dissolved in the first organic solvent and/or the second organic solvent to thereby form an organic vehicle, the organic vehicle is subjected to filtration and then added to the second mixture, impurities, flocculates of the ceramic powder and non-dissolved organic binder, which may exist in the ceramic paste, can be removed, and thus dispersibility of the ceramic paste is reliably enhanced. In addition, the amount of pinholes may be reduced in the resultant ceramic layer.

The first and second organic solvents are chosen such that the relative evaporation rate of the former is higher than that of the latter. Thus, when the first and second organic solvents are chosen such that the boiling point of the former is lower than that of the latter, these solvents are readily chosen.

In the case in which the first and second organic solvents are chosen on the basis of the difference in the boiling point, when the difference between the boiling point of the first organic solvent and that of the second organic solvent is about 50 degrees or more, the first organic solvent can be selectively and easily removed through heating after completion of the second dispersion step.

In the process for producing a monolithic ceramic electronic component of the present invention, a ceramic green sheet and a ceramic green layer which compensates for spaces defined by step-like sections can be uniformly sintered when ceramic powder contained in a ceramic slurry for forming the ceramic green sheet has a composition substantially the same as that of ceramic powder contained in a ceramic paste for forming the ceramic green layer. When the ceramic green sheet and the ceramic green layer are uniformly sintered, cracking or delamination can be prevented.

What is claimed is:

1. A process for producing a monolithic ceramic electronic component, which comprises:
   forming a ceramic paste by
      dispersing a first mixture comprising ceramic powder and a first organic solvent in the absence of an organic binder to provide a primary dispersion,
      dispersing a second mixture comprising an organic binder, a second organic solvent and the primary dispersion to provide a secondary dispersion,
      wherein the second organic solvent has a relative evaporation rate lower than that of the first organic solvent and selectively removing the first organic solvent from the second mixture;
   forming a plurality of composite structures by shaping a ceramic slurry to form a ceramic green sheet having a main surface, applying a conductive paste onto the main surface of the ceramic green sheet so as to provide step sections of an internal circuit element film, and applying said ceramic paste onto the region on the main surface of the sheet not having the internal circuit element film so as to substantially compensate for the spaces defined by the step sections and tp form a ceramic green layer;
   forming a green laminate by laminating a plurality of the composite structures; and
   firing the green laminate.

2. A process for producing a monolithic ceramic electronic component according to claim 1, wherein the first mixture comprises an organic dispersant.

3. A process for producing a monolithic ceramic electronic component according to claim 2, wherein the organic dispersant is about 0.1 to 5 wt. % based on the ceramic powder.

4. A process for producing a monolithic ceramic electronic component according to claim 1, wherein the first organic solvent has a relative evaporation rate of at least about 100 at 20° C., and the second organic solvent has a relative evaporation rate of less that about 50 at 20° C.

5. A process for producing a monolithic ceramic electronic component according to claim 4, wherein the first organic solvent has a relative evaporation rate of at least about 150 at 20° C.

6. A process for producing a monolithic ceramic electronic component according to claim 1, wherein the forming of the ceramic paste further comprises filtering the secondary dispersion before the removal of the first solvent.

7. A process for producing a monolithic ceramic electronic component according to claim 6, wherein the organic binder is dissolved in at least one of the first organic solvent and the second organic solvent to thereby form an organic vehicle; and the organic vehicle is filtrated.

8. A process for producing a monolithic ceramic electronic component according to claim 1, wherein the first organic solvent has a boiling point lower than that of the second organic solvent.

9. A process for producing a monolithic ceramic electronic component according to claim 8, wherein difference between the boiling point of the first organic solvent and that of the second organic solvent is about 50° C. or more.

10. A process for producing a monolithic ceramic electronic component according to claim 9, wherein the boiling point of the second organic solvent is at least about 150° C.

11. A process for producing a monolithic ceramic electronic component according to claim 1, wherein the ceramic slurry and ceramic paste each comprises a ceramic powder of substantially the same composition.

12. A process for producing a monolithic ceramic electronic component according to claim 1, wherein the ceramic powder contained in each of the ceramic slurry and the ceramic paste is a dielectric ceramic powder.

13. A process for producing a monolithic ceramic electronic component according to claim 12, wherein the internal circuit element films are arranged so as to form internal electrodes and to provide capacitance between a pair of electrodes, and the monolithic ceramic electronic component is a monolithic ceramic capacitor after firing the green laminate.

14. A process for producing a monolithic ceramic electronic component according to claim 1, wherein the ceramic powder contained in each of the ceramic slurry and the ceramic paste is a magnetic ceramic powder.

15. A process for producing a monolithic ceramic electronic component according to claim 14, wherein the internal circuit element films are curved and disposed so as to form a monolithic inductor when the green laminate is fired.

16. A process for producing a ceramic paste, which comprises:

dispersing a first mixture comprising ceramic powder and a first organic solvent in the absence of an organic binder to provide a primary dispersion;

dispersing a second mixture comprising an organic binder, second organic solvent and the primary dispersion to provide a secondary dispersion;

wherein the second organic solvent has a relative evaporation rate lower than that of the first organic solvent ; and removing the first organic solvent from the second mixture.

17. A process for producing a ceramic paste according to claim 16, wherein the first organic solvent has an evaporation rate relative to n-butyl acetate of at least about 100 at 20° C., and the second organic solvent has an evaporation rate relative to n-butyl acetate of less that about 50 at 20° C.

18. A process for producing a ceramic paste according to claim 16, wherein the first organic solvent has a boiling point lower than that of the second organic solvent.

* * * * *